United States Patent
Pu et al.

(10) Patent No.: US 11,668,489 B2
(45) Date of Patent: Jun. 6, 2023

(54) COMMUNICATION CIRCUIT FOR INDOOR AND OUTDOOR UNITS OF AIR CONDITIONER AND AIR CONDITIONER

(71) Applicant: Guangdong Giwee Technology Co. Ltd., Foshan (CN)

(72) Inventors: Zhicheng Pu, Foshan (CN); Zhijie Zhang, Foshan (CN)

(73) Assignee: GUANGDONG GIWEE TECHNOLOGY CO. LTD., Foshan (CN)

( * ) Notice: Subject to any disclaimer, the term of this patent is extended or adjusted under 35 U.S.C. 154(b) by 132 days.

(21) Appl. No.: 17/380,617

(22) Filed: Jul. 20, 2021

(65) Prior Publication Data

US 2022/0026103 A1    Jan. 27, 2022

(30) Foreign Application Priority Data

Jul. 24, 2020    (CN) .......................... 202010724445.X

(51) Int. Cl.
| | |
|---|---|
| F24F 11/88 | (2018.01) |
| F24F 11/65 | (2018.01) |
| F24F 11/56 | (2018.01) |
| F24F 1/0003 | (2019.01) |
| F24F 1/20 | (2011.01) |

(52) U.S. Cl.
CPC ............ *F24F 11/88* (2018.01); *F24F 1/0003* (2013.01); *F24F 1/20* (2013.01); *F24F 11/56* (2018.01); *F24F 11/65* (2018.01)

(58) Field of Classification Search
CPC .. F24F 11/88; F24F 11/56; F24F 11/65; F24F 11/89; F24F 11/20; F24F 1/20; F24F 1/0003
See application file for complete search history.

(56) References Cited

U.S. PATENT DOCUMENTS

| | | | |
|---|---|---|---|
| 10,240,809 B1* | 3/2019 | Duvivier | F24F 11/88 |
| 2016/0105019 A1* | 4/2016 | Mukai | F24F 11/30 |
| | | | 361/93.9 |
| 2018/0019787 A1* | 1/2018 | Kotake | H04L 25/0278 |
| 2018/0112837 A1* | 4/2018 | Sadwick | H05B 45/3725 |
| 2018/0139517 A1* | 5/2018 | Schwartz | H04Q 9/00 |
| 2019/0145648 A1* | 5/2019 | Sinha | G08B 21/10 |
| | | | 219/482 |

* cited by examiner

*Primary Examiner* — Nelson J Nieves
(74) *Attorney, Agent, or Firm* — Cantor Colburn LLP

(57) ABSTRACT

A communication circuit for indoor and outdoor units of an air conditioner and an air conditioner. The circuit includes an outdoor unit sending module, an outdoor unit receiving module, an indoor unit receiving module, an indoor unit sending module, a weak electricity grounding end and a voltage regulation rectifying circuit, wherein the voltage regulation rectifying circuit, the outdoor unit receiving module, the outdoor unit sending module, the indoor unit receiving module, the indoor unit sending module and the weak electricity grounding end are sequentially connected in series to form a loop; the voltage regulation rectifying circuit is configured to convert alternating current of a main control board of an indoor unit into direct current, and supply electricity to the loop.

10 Claims, 2 Drawing Sheets

COMMUNICATION CIRCUIT FOR INDOOR AND OUTDOOR UNITS OF AIR CONDITIONER AND AIR CONDITIONER

FOREIGN PRIORITY

This application claims priority to Chinese Patent Application No. 202010724445.X, filed Jul. 24, 2020, and all the benefits accruing therefrom under 35 U.S.C. § 119, the contents of which in its entirety are herein incorporated by reference.

TECHNICAL FIELD

The present invention relates to the technical field of air conditioners, and more particularly relates to a communication circuit for indoor and outdoor units of an air conditioner and an air conditioner.

BACKGROUND

Generally, weak electricity for a main control board of an indoor unit of an air conditioner is supplied to the main control board by transforming 220 V alternating current into a low-voltage alternating current through a transformer, and then converting the low-voltage alternating current into low-voltage direct current through a voltage-stabilizing chip.

Existing air conditioner having indoor and outdoor units often communicated through a current loop. A current loop communication circuit performs voltage division by a resistor on a 220 V alternating current which is used for power supply to an electric control board of an indoor unit, to obtain a 24 V direct current, and then carries a signal on the current loop communication circuit, to realize a communication circuit for long-distance signal transmission.

The above current loop communication circuit has the following problems in practical application.

A 220 V alternating current is subject to voltage division by a resistor to obtain a 24 V direct current, while a circuit of the 220 V alternating current tends to be interfered by strong electricity; and a communication wire for strong electricity and a power supply for a main control board of the indoor unit share an N wire, which has a wire diameter the same as that of a power supply wire, but the current in an actual communication wire is much smaller than the main power supply current in the main control board of the indoor unit. Therefore, the cost is increased since the communication wire uses the same size of wire diameter, and additionally, since a great number of electrical apparatuses are used at the same time, the N wire is interfered by different apparatuses, which tend to cause communication abnormity.

SUMMARY

The present invention is mainly directed to provide a communication circuit for indoor and outdoor units of an air conditioner and an air conditioner, and aims at solving the technical problems that an N wire is shared in the prior art, so that the cost is increased, and the communication is easily interfered.

The present invention provides a communication circuit for indoor and outdoor units of an air conditioner, including: an outdoor unit sending module, connected with an outdoor unit sending end, wherein the outdoor unit sending module is switched on when the outdoor unit sending end is input with a high level, and the outdoor unit sending module is switched off when the outdoor unit sending end is input with a low level; an outdoor unit receiving module, connected with the outdoor unit sending module, and is connected with an outdoor unit receiving end, wherein the outdoor unit receiving end outputs a high level signal 1 when the outdoor unit receiving module is switched on, and the outdoor unit receiving end outputs a low level signal 0 when the outdoor unit receiving module is switched off; an indoor unit receiving module, connected with the outdoor unit receiving module, and connected with an indoor unit receiving end, wherein the indoor unit receiving end outputs a high level signal 1 when the indoor unit receiving module is switched on, and the indoor unit receiving end outputs a low level signal 0 when the indoor unit receiving module is switched off; an indoor unit sending module, connected with the indoor unit receiving module, and connected with an indoor unit sending end, wherein the indoor unit sending module is switched on when the indoor unit sending end is input with a high level, and the indoor unit sending module is switched off when the indoor unit sending end is input with a low level; a weak electricity grounding end connected with the indoor unit sending module; and a voltage regulation rectifying circuit, connected with the outdoor unit receiving module through a first connecting wire and connected with a main control board of an indoor unit.

The voltage regulation rectifying circuit, the outdoor unit receiving module, the outdoor unit sending module, the indoor unit receiving module, the indoor unit sending module and the weak electricity grounding end are sequentially connected in series to form a loop.

The voltage regulation rectifying circuit is configured to convert alternating current of the main control board of the indoor unit into direct current and supply electricity to the loop.

Further, the voltage regulation rectifying circuit is a voltage-doubling rectifying circuit.

Further, the outdoor unit sending module includes a first optical coupler; the first optical coupler includes a first phototriode and a first light emitting diode; an emitter electrode of the first phototriode is electrically connected with the indoor unit receiving module, and a collector electrode of the first phototriode is connected with the indoor unit receiving module; and an anode of the first light emitting diode is connected with the outdoor unit receiving end, and a cathode of the first light emitting diode is connected with a strong electricity grounding end.

Further, the outdoor unit receiving module includes a second optical coupler. The second optical coupler includes a second phototriode and a second light emitting diode; an emitter electrode of the second phototriode is connected with the outdoor unit receiving end, and a collector electrode of the second phototriode is connected with an input voltage end; and an anode of the second light emitting diode is connected with the voltage regulation rectifying circuit through the first connecting wire, and a cathode of the second light emitting diode is connected with the outdoor unit sending module.

Further, the indoor unit receiving module includes a third optical coupler. The third optical coupler includes a third phototriode and a third light emitting diode; an emitter electrode of the third phototriode is connected with the indoor unit receiving end, and a collector electrode of the third phototriode are connected with the input voltage end; and an anode of the third light emitting diode is connected with the outdoor unit sending module, and a cathode of the third light emitting diode is connected with the indoor unit sending module.

Further, the indoor unit sending module includes a fourth optical coupler. The fourth optical coupler includes a fourth phototriode and a fourth light emitting diode; an emitter electrode of the fourth phototriode is connected with the weak electricity grounding end, and a collector electrode of the fourth phototriode is connected with the indoor unit receiving module; and an anode of the fourth light emitting diode is electrically connected with the indoor unit sending end, and a cathode of the fourth light emitting diode is connected with the strong electricity grounding end.

Further, the anode of the fourth light emitting diode is connected with the indoor unit sending end through a first triode; an emitter electrode of the first triode is connected with an anode of the fourth light emitting diode; a collector electrode of the first triode is connected with the input voltage end; and a base electrode of the first triode is connected with the indoor unit sending end.

Further, the communication circuit for indoor and outdoor units of an air conditioner further includes a first diode assembly. The first diode assembly includes one or more diodes connected in series in the same direction, an anode of the first diode assembly is electrically connected with the outdoor unit sending module, and a cathode of the first diode assembly is electrically connected with the indoor unit receiving module.

Further, the communication circuit for indoor and outdoor units of an air conditioner further includes a third diode. A cathode of the third diode is connected with the outdoor unit sending module and the indoor unit receiving module; and an anode of the third diode is connected with the indoor unit sending module and the indoor unit receiving module.

The present invention further provides an air conditioner, including the communication circuit for indoor and outdoor units of an air conditioner.

The present invention has the beneficial effects that the voltage regulation rectifying circuit converts alternating current of the main control board of the indoor unit into direct current, and supplies the direct current to the loop which is weak electricity to be supplied to the loop, eliminating the need to share the N wire, avoiding the interference caused by other apparatuses on communication while ensuring mutual communication between indoor and outdoor units. Additionally, the first connecting wire is independent from the N wire, so that a narrower wire is sufficient to meet the application requirement, and thus the cost can be reduced.

The implementation of the objectives, the functional features and the advantages of the present invention will be further explained with reference to the embodiments and the accompanying drawings.

DETAILED DESCRIPTION OF THE INVENTION

It should be understood that specific embodiments described herein are merely used to illustrate the present invention, and are not intended to limit the present invention.

Figure 1:
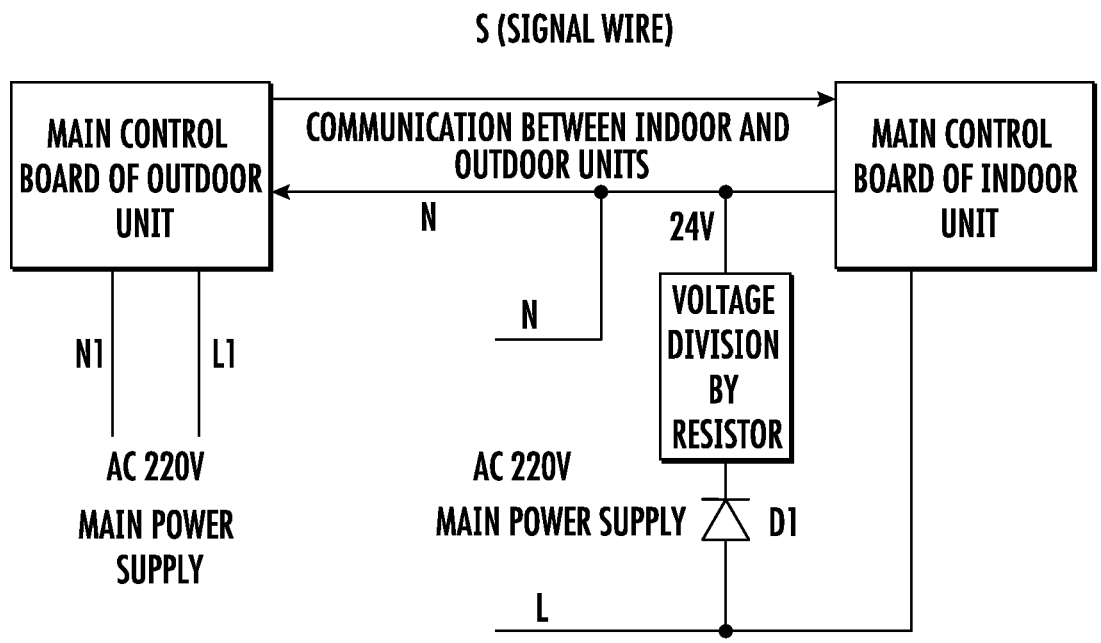
FIG. 1 is a schematic diagram of a communication connection mode between indoor and outdoor units in the prior art.
Figure 2:
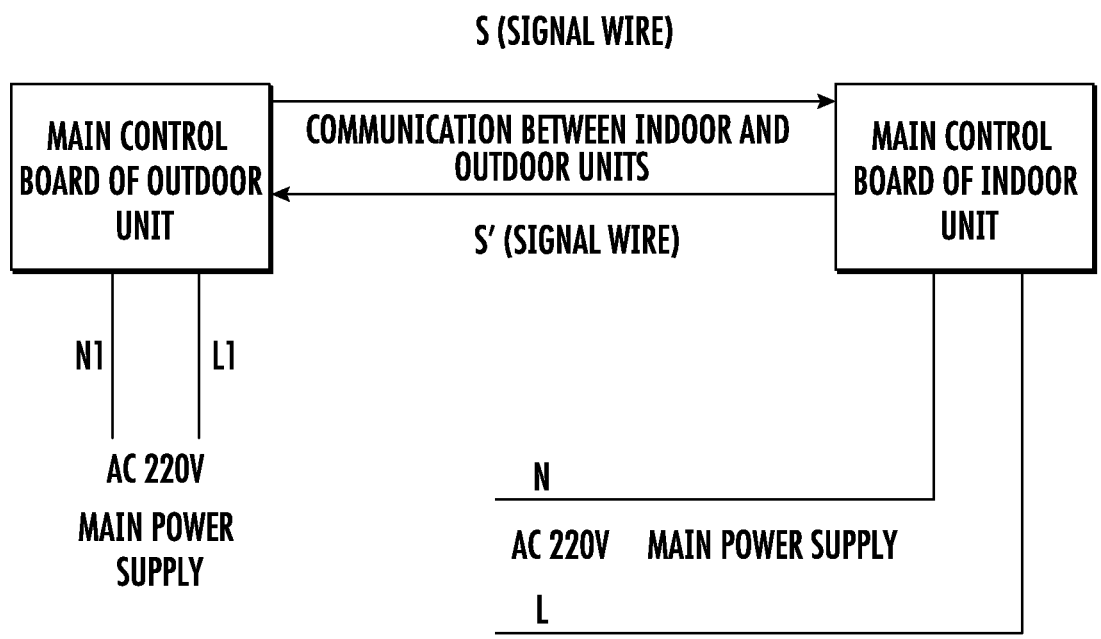
FIG. 2 is a schematic diagram of a communication connection mode between indoor and outdoor units in the present invention.
Figure 3:
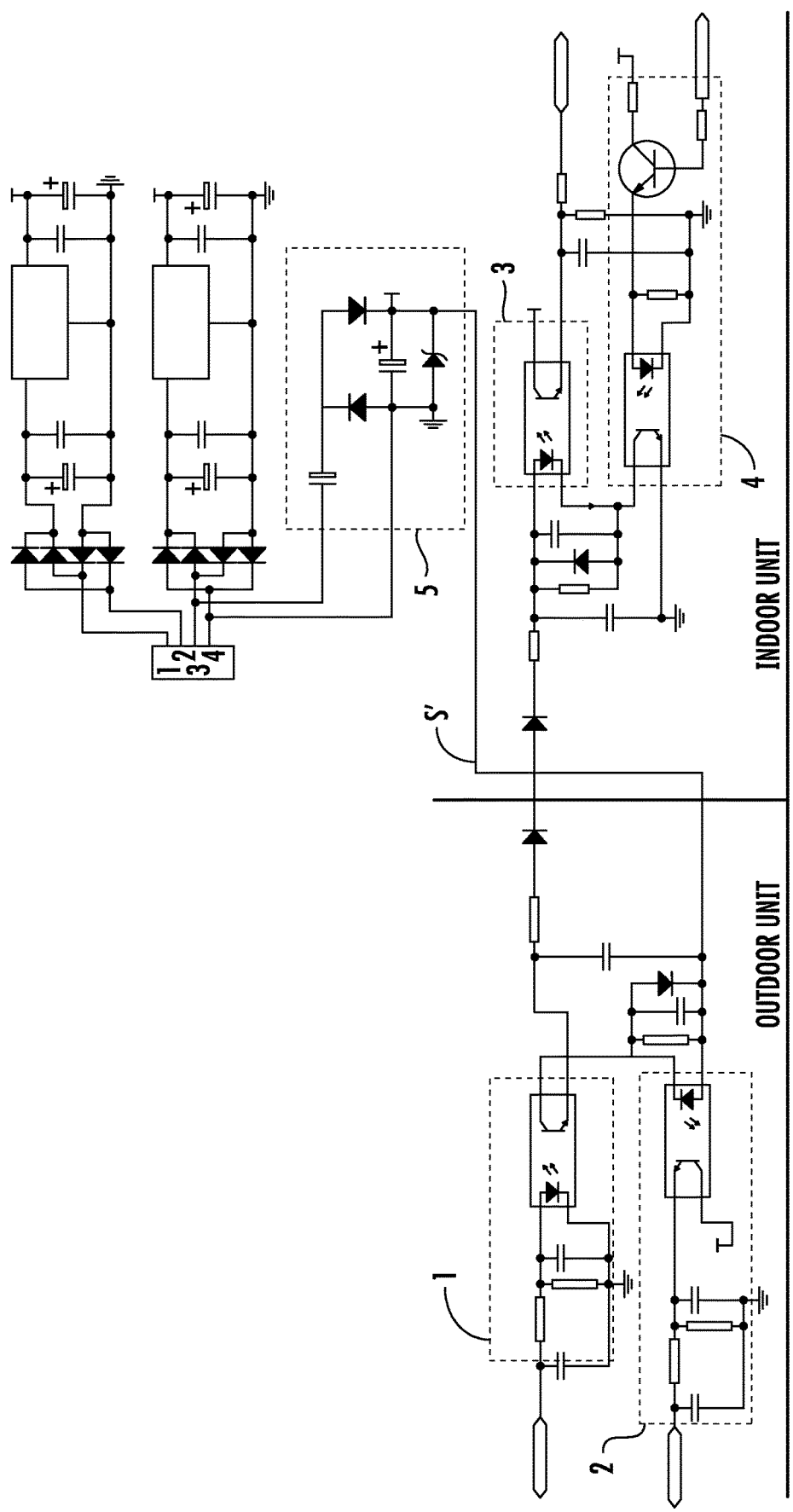
FIG. 3 is a schematic structure diagram of an embodiment of a communication circuit for indoor and outdoor units of an air conditioner of the present invention.

Referring to FIG. 1 to FIG. 3, a communication circuit for indoor and outdoor units of an air conditioner provided by the present invention includes an outdoor unit sending module 1, an outdoor unit receiving module 2, an indoor unit receiving module 3, an indoor unit sending module 4, a weak electricity grounding end GND-24 and a voltage regulation rectifying circuit 5. The outdoor unit sending module 1 is connected with an outdoor unit sending end OUT-TXD. The outdoor unit sending module 1 is switched on when the outdoor unit sending end OUT-TXD is input with a high level, and the outdoor unit sending module 1 is switched off when the outdoor unit sending end OUT-TXD is input with a low level. The outdoor unit receiving module 2 is connected with the outdoor unit sending module 1, and is connected with an outdoor unit receiving end OUT-RXD. The outdoor unit receiving end OUT-RXD outputs a high level signal 1 when the outdoor unit receiving module 2 is switched on, and the outdoor unit receiving end OUT-RXD outputs a low level signal 0 when the outdoor unit receiving module 2 is switched off. The indoor unit receiving module 3 is connected with the outdoor unit receiving module 2, and is connected with an indoor unit receiving end IN-RXD. The indoor unit receiving end IN-RXD outputs a high level signal 1 when the indoor unit receiving module 3 is switched on, and the indoor unit receiving end IN-RXD outputs a low level signal 0 when the indoor unit receiving module 3 is switched off. The indoor unit sending module 4 is connected with the indoor unit receiving module 3, and is connected with the indoor unit sending end IN-TXD. The indoor unit sending module 4 is switched on when the indoor unit sending end IN-TXD is input with a high level, and the indoor unit sending module 4 is switched off when the indoor unit sending end IN-TXD is input with a low level. The weak electricity grounding end GND-24 is connected with the indoor unit sending module 4. The voltage regulation rectifying circuit 5 is connected with the outdoor unit receiving module 2 through a first connecting wire S' and is connected with a main control board of an indoor unit. The voltage regulation rectifying circuit 5, the outdoor unit receiving module 2, the outdoor unit sending module 1, the indoor unit receiving module 3, the indoor unit sending module 4 and the weak electricity grounding end GND-24 are sequentially connected in series to form a loop. The voltage regulation rectifying circuit 5 is configured to convert alternating current of the main control board of the indoor unit into direct current and supply electricity to the loop.

Specifically, the present invention may be, but not limited to be used in an air conditioner. For convenience of description, hereinafter, indoor and outdoor units will be separately described. For the outdoor unit sending end OUT-TXD, the outdoor unit receiving end OUT-RXD and a main control chip of the outdoor unit, the main control chip of the outdoor unit can receive a signal (i.e., high or low level) of the outdoor unit receiving end OUT-RXD, the outdoor unit main control chip can also control the on-off state of the outdoor unit sending module 1 by controlling the level signal input into the outdoor unit sending end OUT-TXD, and additionally, it should be noted that when the outdoor unit sends a signal to the indoor unit, although the main control chip of the outdoor unit can receive a signal from the outdoor unit receiving end OUT-RXD, it can refuse to recognize or process the signal. In a similar way, for the indoor unit sending end IN-TXD, the indoor unit receiving end IN-RXD and a main control chip of the indoor unit, the main control chip of the indoor unit can receive a signal (i.e., high or low level) of the indoor unit receiving end IN-RXD, the main control chip of the indoor unit can also control the on-off state of the indoor unit sending module 4 by controlling the level signal input into the indoor unit sending end IN-TXD, and additionally, it should be noted that when the indoor unit sends a signal to the outdoor unit, although the main control chip of the indoor unit can receive the signal from the indoor unit receiving end IN-RXD, it can refuse to recognize or process the signal. Specifically, when the loop is closed, the outdoor unit receiving end OUT-RXD outputs the high level signal 1, and the indoor unit receiving end IN-RXD outputs the high level signal 1. When the outdoor unit sending module 1 maintains a switched-on state, the indoor unit sending module 4 is controlled to be switched off by the main control chip of the indoor unit, so that the loop is opened, the outdoor unit receiving end OUT-RXD outputs the low level signal 0, the indoor unit receiving end IN-RXD outputs the low level signal 0, and sending the signal from the indoor unit to the outdoor unit is enabled. In a similar way, when the indoor unit sending module 4 maintains a switched-on state, the on-off state of the outdoor unit sending module 1 is controlled through the main control chip of the outdoor unit, and sending the signal from the outdoor unit to the indoor unit can be enabled.

It should be noted that the weak electricity grounding end GND-24 shall be separated from the strong electricity grounding end (i.e., a 220 V voltage grounding end), to avoid direct ground connection between alternating and direct current sides, improving the communication reliability and safety of the communication circuit for indoor and outdoor units of the air conditioner. The strong electricity grounding end is represented by GND-Indocr in the indoor unit, and the strong electricity grounding end is represented by GND-Outdocr in the indoor unit.

The voltage regulation rectifying circuit 5 converts alternating current of the main control board of the indoor unit into direct current, and supplies the direct current to the loop, which is weak electricity to be supplied to the loop, eliminating the need to share the N wire, avoiding the interference caused by other apparatuses on communication while ensuring mutual communication between indoor and outdoor units. Additionally, the first connecting wire S' is independent from the N wire, so that a narrower wire is sufficient to meet the application requirement, and thus the cost can be reduced.

Further, the voltage regulation rectifying circuit 5 is a voltage-doubling rectifying circuit.

Specifically, weak electricity for a main control board of an indoor unit of an air conditioner is generally supplied to the main control board by transforming 220 V alternating current into a low-voltage alternating current through a transformer, and then converting the low-voltage alternating current into low-voltage direct current through a voltage-stabilizing chip. The secondary output of the transformer is divided into two branches: one branch is AC 16.3 V±5%, and the other branch is AC 12.2 V±5%. In the present embodiment, the branch of AC 12.2 V is taken to be used as input of the voltage-doubling rectifying circuit, and is converted into a 24 V direct current through the voltage-doubling rectifying circuit.

Specifically, the voltage-doubling rectifying circuit includes a fourth diode D9, a fifth diode D10 and a first capacitor E5. One end of a secondary output end of the transformer is connected with one end of the first capacitor E5, the other end is connected with an anode of the fourth diode D9 and the weak electricity grounding end GND-24, a cathode of the fourth diode D9 is connected with the other end of the first capacitor E5, an anode of the fifth diode D10 is connected with the other end of the first capacitor E5, and a cathode of the fifth diode D10 is connected with the first connecting wire S'. The above structure is a basic structure of the voltage-doubling rectifying circuit, and a work principle is known in the prior art, so the descriptions thereof are omitted herein.

Additionally, the voltage-doubling rectifying circuit also includes a first voltage Zener diode Z1 and a second capacitor E6, an anode of the first voltage Zener diode and one end of the second capacitor E6 are respectively connected with the cathode of the fourth diode D9, a cathode of the first voltage Zener diode and the other end of the second capacitor E6 are respectively connected with the cathode of the fifth diode D10, and the first voltage Zener diode Z1 and the second capacitor E6 smoothen fluctuating direct current rectified from the diode, and process fluctuating direct current into smooth direct current.

Further, the outdoor unit sending module 1 includes a first optical coupler IC4. The first optical coupler IC4 includes a first phototriode and a first light emitting diode. An emitter electrode of the first phototriode is electrically connected with the indoor unit receiving module 3, and a collector electrode of the first phototriode is connected with the indoor unit receiving module 3. An anode of the first light emitting diode is connected with the outdoor unit receiving end OUT-RXD, and a cathode of the first light emitting diode is connected with the strong electricity grounding end.

Specifically, when the outdoor unit receiving end OUT-RXD is input with a high level, the first light emitting diode is switched on to emit light, the first phototriode is switched on, and the first optical coupler IC4 is switched on. The outdoor unit sending module 1 is simple in structure, stable in work, and low in cost. Additionally, for an anti-interference purpose, in some embodiments, a capacitor C6 and a resistor R6 which are connected in parallel are connected between the anode and the cathode of the first light emitting diode to achieve filtering and anti-interference effects.

Further, the outdoor unit receiving module 2 includes a second optical coupler IC5. The second optical coupler IC5 includes a second phototriode and a second light emitting diode. An emitter electrode of the second phototriode is connected with the outdoor unit receiving end OUT-RXD, and a collector electrode of the second phototriode is connected with an input voltage end. An anode of the second light emitting diode is connected with the voltage regulation rectifying circuit 5 through the first connecting wire S', and a cathode of the second light emitting diode is connected with the outdoor unit sending module 1.

Specifically, the input voltage end is input with a 5 V voltage. When the loop is closed, the second light emitting diode emits light, the second phototriode is switched on, the outdoor unit receiving end OUT-RXD further outputs the high level signal 1. In a similar way, when the loop is opened, the outdoor unit receiving end OUT-RXD outputs the low level signal 0. The outdoor unit receiving module 2 is simple in structure, stable in work, and low in cost. Preferably, in order to improve the anti-interference performance, capacitors C11 and C12 in parallel connection and a resistor R13 are connected between the emitter electrode of the second phototriode and the strong electricity grounding end. In order to achieve voltage division and current limitation effects, a resistor R11 is connected in series between the emitter electrode of the second phototriode and the outdoor unit receiving end OUT-RXD.

Further, the indoor unit receiving module 3 includes a third optical coupler IC3. The third optical coupler IC3 includes a third phototriode and a third light emitting diode.

An emitter electrode of the third phototriode is connected with the indoor unit receiving end IN-RXD, and a collector electrode of the third phototriode is connected with the input voltage end. An anode of the third light emitting diode is connected with the outdoor unit sending module 1, and a cathode of the third light emitting diode is connected with the indoor unit sending module 4.

Specifically, the input voltage end is input with a 5 V voltage. When the loop is closed, the third light emitting diode emits light, the third phototriode is switched on, and the outdoor unit receiving end OUT-RXD outputs the high level signal 1. In a similar way, when the loop is opened, the outdoor unit receiving end OUT-RXD outputs the low level signal 0. The outdoor unit receiving module 2 is simple in structure, stable in work, and low in cost.

Further, the indoor unit sending module 4 includes a fourth optical coupler IC6. The fourth optical coupler IC6 includes a fourth phototriode and a fourth light emitting diode. An emitter electrode of the fourth phototriode is connected with the weak electricity grounding end GND-24, and a collector electrode of the fourth phototriode is connected with the indoor unit receiving module 3. An anode of the fourth light emitting diode is electrically connected with the indoor unit sending end IN-TXD, and a cathode of the fourth light emitting diode is connected with the strong electricity grounding end.

Specifically, when the indoor unit sending end IN-TXD is input with the high level, the fourth light emitting diode is switched on and emits light, the fourth phototriode is switched on, and the fourth optical coupler IC6 is switched on. The indoor unit sending module 4 is simple in structure, stable in work, and low in cost.

Further, in the present embodiment, the anode of the fourth light emitting diode is electrically connected with the indoor unit sending end IN-TXD through a first triode Q1. An emitter electrode of the first triode Q1 is connected with an anode of the fourth light emitting diode. A collector electrode of the first triode Q1 is connected with the input voltage end. A base electrode of the first triode Q1 is connected with the indoor unit sending end IN-TXD.

Specifically, when the indoor unit sending end IN-TXD is controlled by the main control chip of the indoor unit to input the high level, the first triode Q1 is switched on, the fourth light emitting diode is further switched on and emits light, the fourth phototriode is switched on, the fourth optical coupler IC6 is switched on, and the on-off state of the collector electrode of the first triode Q1 and the input voltage end is controlled through the first triode Q1.

In order to improve the anti-interference performance, the communication circuit for indoor and outdoor units of an air conditioner is further provided with capacitors and resistors in parallel connection, such as a resistor R5 and a capacitor C5, and a resistor R7 and a capacitor C7, and is also provided with capacitors C8 and C9, their connection positions are as shown in the accompanying drawings, and the descriptions thereof are omitted herein. In order to achieve the voltage division and current limitation effects, the communication circuit for indoor and outdoor units of an air conditioner is further provided with one or more of resistors R3, R1, R2, R4, R8, R9 and R12, their connection positions are as shown in the accompanying drawings, and the descriptions thereof are omitted herein.

In some embodiments, the communication circuit for indoor and outdoor units of an air conditioner further includes a first diode assembly. The first diode assembly includes one or more diodes connected in series in the same direction, an anode of the first diode assembly is electrically connected with the outdoor unit sending module 1, and a cathode of the first diode assembly is electrically connected with the indoor unit receiving module 3.

Through the first diode assembly, the effect of limiting the current flowing direction in the loop can be achieved, and the communication circuit for indoor and outdoor units of an air conditioner is further protected.

Further, the first diode assembly includes a first diode and a second diode. An anode of the first diode is connected with the outdoor unit sending module 1, a cathode of the first diode is connected with the anode of the first diode through a second connecting wire S, and a cathode of the second diode is connected with the indoor unit receiving module 3. The anode of the first diode is an anode of a diode assembly, and the cathode of the second diode is the cathode of a diode assembly. The first diode is disposed at the outdoor unit, the second diode is disposed at the indoor unit, and a protection effect is achieved. The second connecting wire is connected with the indoor unit and the outdoor unit to achieve a connection effect.

Further, the communication circuit for indoor and outdoor units of an air conditioner further includes a third diode D13. A cathode of the third diode D13 is connected with the outdoor unit sending module 1 and the indoor unit receiving module 3. An anode of the third diode D13 is connected with the indoor unit sending module 4 and the indoor unit receiving module 3.

Further, the communication circuit for indoor and outdoor units of an air conditioner further includes a sixth diode D14. A cathode of the sixth diode D14 is connected with the voltage regulation rectifying circuit 5. An anode of the third diode D13 is connected with the outdoor unit sending module 1 and the outdoor unit receiving module 2.

The third diode D13 and the sixth diode D14 enable the voltage at the light emitting diode side of the optical coupler to fast lower down when the loop is opened, the reliable switching off of the receiving optical coupler is ensured, wrong communication is avoided, and the communication reliability is improved.

The present invention further provides an air conditioner including the communication circuit for indoor and outdoor units of an air conditioner.

The present invention has the beneficial effects that the voltage regulation rectifying circuit 5 is configured to convert alternating current of the main control board of the indoor unit into direct current, and supply the direct current to the loop, which is weak electricity to be supplied to the loop, eliminating the need to share the N wire, avoiding the interference caused by other apparatuses on communication while ensuring mutual communication between indoor and outdoor units. Additionally, the first connecting wire S' is independent from the N wire, so that a narrower wire is sufficient to meet the application requirement, and thus the cost can be reduced.

The above descriptions are only exemplary embodiments of the present invention, and thus do not limit the protection scope of the present invention. Equivalent structures or equivalent flow process transformations made according to the description and the accompanying drawings of the present invention, or direct or indirect applications to other related technical fields all fall within in the protection scope of the present invention.

What is claimed is:

1. Communication circuit for indoor and outdoor units of an air conditioner, comprising:
    an outdoor unit sending module, connected with an outdoor unit sending end, wherein the outdoor unit sending module is switched on when the outdoor unit sending end is input with a high level, and the outdoor unit sending module is switched off when the outdoor unit sending end is input with a low level;

an outdoor unit receiving module, connected with the outdoor unit sending module, and connected with an outdoor unit receiving end, wherein the outdoor unit receiving end outputs a high level signal 1 when the outdoor unit receiving module is switched on, and the outdoor unit receiving end outputs a low level signal 0 when the outdoor unit receiving module is switched off;

an indoor unit receiving module, connected with the outdoor unit receiving module, and connected with an indoor unit receiving end, wherein the indoor unit receiving end outputs a high level signal 1 when the indoor unit receiving module is switched on, and the indoor unit receiving end outputs a low level signal 0 when the indoor unit receiving module is switched off;

an indoor unit sending module, connected with the indoor unit receiving module, and connected with an indoor unit sending end, wherein the indoor unit sending module is switched on when the indoor unit sending end is input with a high level, and the indoor unit sending module is switched off when the indoor unit sending end is input with a low level;

a weak electricity grounding end connected with the indoor unit sending module; and a voltage regulation rectifying circuit, connected with the outdoor unit receiving module through a first connecting wire and connected with a main control board of an indoor unit, wherein the voltage regulation rectifying circuit, the outdoor unit receiving module, the outdoor unit sending module, the indoor unit receiving module, the indoor unit sending module and the weak electricity grounding end are sequentially connected in series to form a loop; and the voltage regulation rectifying circuit is configured to convert alternating current of the main control board of the indoor unit into direct current and supply electricity to the loop.

2. The communication circuit for indoor and outdoor units of an air conditioner according to claim 1, wherein the voltage regulation rectifying circuit is a voltage-doubling rectifying circuit.

3. The communication circuit for indoor and outdoor units of an air conditioner according to claim 1, wherein the outdoor unit sending module comprises:

a first optical coupler, comprising a first phototriode and a first light emitting diode;

an emitter electrode of the first phototriode is electrically connected with the indoor unit receiving module, and a collector electrode of the first phototriode is connected with the indoor unit receiving module; and an anode of the first light emitting diode is connected with the outdoor unit receiving end, and a cathode of the first light emitting diode is connected with a strong electricity grounding end.

4. The communication circuit for indoor and outdoor units of an air conditioner according to claim 1, wherein the outdoor unit receiving module comprises:

a second optical coupler, comprising a second phototriode and a second light emitting diode;

an emitter electrode of the second phototriode is connected with the outdoor unit receiving end, and a collector electrode of the second phototriode is connected with an input voltage end; and an anode of the second light emitting diode is connected with the voltage regulation rectifying circuit through the first connecting wire, and a cathode of the second light emitting diode is connected with the outdoor unit sending module.

5. The communication circuit for indoor and outdoor units of an air conditioner according to claim 1, wherein the indoor unit receiving module comprises:

a third optical coupler, comprising a third phototriode and a third light emitting diode;

an emitter electrode of the third phototriode is connected with the indoor unit receiving end, and a collector electrode of the third phototriode is connected with the input voltage end; and an anode of the third light emitting diode is connected with the outdoor unit sending module, and a cathode of the third light emitting diode is connected with the indoor unit sending module.

6. The communication circuit for indoor and outdoor units of an air conditioner according to claim 1, wherein the indoor unit sending module comprises:

a fourth optical coupler, comprising a fourth phototriode and a fourth light emitting diode;

an emitter electrode of the fourth phototriode is connected with the weak electricity grounding end, and a collector electrode of the fourth phototriode is connected with the indoor unit receiving module; and an anode of the fourth light emitting diode is electrically connected with the indoor unit sending end, and a cathode of the fourth light emitting diode is connected with the strong electricity grounding end.

7. The communication circuit for indoor and outdoor units of an air conditioner according to claim 6, wherein the anode of the fourth light emitting diode is electrically connected with the indoor unit sending end through a first triode;

an emitter electrode of the first triode is connected with an anode of the fourth light emitting diode;

a collector electrode of the first triode is connected with the input voltage end; and a base electrode of the first triode is connected with the indoor unit sending end.

8. The communication circuit for indoor and outdoor units of an air conditioner according to claim 1, further comprising a first diode assembly, wherein the first diode assembly comprises one or more diodes connected in series in the same direction, an anode of the first diode assembly is electrically connected with the outdoor unit sending module, and a cathode of the first diode assembly is electrically connected with the indoor unit receiving module.

9. The communication circuit for indoor and outdoor units of an air conditioner according to claim 1, further comprising a third diode, wherein a cathode of the third diode is connected with the outdoor unit sending module and the indoor unit receiving module; and an anode of the third diode is connected with the indoor unit sending module and the indoor unit receiving module.

10. An air conditioner, comprising the communication circuit for indoor and outdoor units of an air conditioner according to claim 1.

* * * * *